United States Patent [19]
Weaver et al.

[11] 3,980,636
[45] Sept. 14, 1976

[54] PHENYL-AZO-ANILINE DYES

[75] Inventors: Max A. Weaver; Clarence A. Coates, Jr., both of Kingsport, Tenn.

[73] Assignee: Eastman Kodak Company, Rochester, N.Y.

[22] Filed: Oct. 7, 1974

[21] Appl. No.: 512,637

Related U.S. Application Data

[63] Continuation-in-part of Ser. No. 194,000, Oct. 29, 1971, abandoned.

[52] U.S. Cl............................ 260/207.1; 260/152; 260/158; 260/207; 260/208
[51] Int. Cl.²................ C09B 29/06; C09B 29/24; C09B 29/36; D06P 3/52
[58] Field of Search........................ 260/267, 207.1

[56] References Cited
UNITED STATES PATENTS

| | | | |
|---|---|---|---|
| 2,238,486 | 4/1941 | Dickey et al..................... | 260/207.1 |
| 2,346,013 | 4/1944 | Dickey............................ | 260/207.1 |
| 2,397,927 | 4/1946 | Dickey et al....................... | 260/199 |
| 3,206,454 | 9/1965 | Merian et al. .................... | 260/205 |
| 3,379,716 | 4/1968 | Wallace .......................... | 260/207.1 |
| 3,546,204 | 12/1970 | Weaver et al...................... | 260/205 |

*Primary Examiner*—Floyd D. Higel
*Attorney, Agent, or Firm*—Donald W. Spurrell; Daniel B. Reece, III

[57] ABSTRACT

Azo compounds having the formula

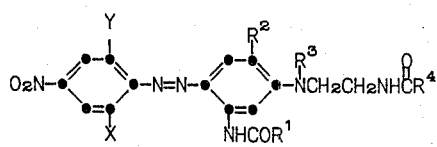

in which X and Y are hydrogen or a substituent, $R^1$ is alkyl or $R^4$, $R^2$ is hydrogen, alkyl or alkoxy, $R^3$ is hydrogen or alkyl, and $R^4$ is aryl, cyclohexyl, alkoxy, benzyl, 2-furyl or $-R^5-O-Z$ in which $R^5$ is alkylene and Z is aryl. The compounds are useful for dyeing polyester fibers and exhibit good dyeability, fastness to light and resistance to sublimation.

8 Claims, No Drawings

PHENYL-AZO-ANILINE DYES

This is a continuation-in-part application of U.S. patent application Ser. No. 194,000 filed Oct. 29, 1971, now abandoned.

This invention concerns certain novel azo compounds useful for dyeing polyester textile materials. Our novel azo compounds have the formula (I) 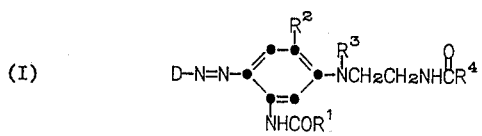

wherein
D is a group having the formula

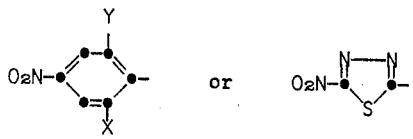

in which
X is hydrogen, chlorine, bromine, cyano, lower alkylsulfonyl, or nitro; and
Y is hydrogen or cyano;
$R^1$ is lower alkyl; lower alkyl substituted with halogen, hydroxy, lower alkoxy, lower alkanoyloxy, cyano or carbamoyl; or a group represented by $R^4$;
$R^2$ is hydrogen, lower alkyl or lower alkoxy;
$R^3$ is hydrogen or alkyl of up to about eight carbon atoms; and
$R^4$ is aryl, cyclohexyl, lower alkoxy, benzyl, 2-furyl or the group —$R^5$—O—Z in which $R^5$ is alkylene of up to about six carbon atoms and Z is aryl;
in which
each aryl group is phenyl or phenyl substituted with lower alkyl, lower alkoxy or halogen.

Our novel compounds, in general, exhibit a desirable combination of good properties when applied to polyester textile fibers according to conventional techniques. The compounds of the invention possess excellent fastness to light and resistance to sublimation. Our compounds also exhibit good dyeability and therefore produce on polyester fibers deep, level dyeings which do not crock. The improved dyeability also is manifested by the good build-up which our compounds exhibit. This combination of properties renders our compounds valuable polyester dyes and distinguishes them from the compounds disclosed in Belgian Pat. No. 654,637 and Canadian Pat. No. 754,146.

The substituents represented by each of $R^1$, $R^2$, $R^3$, $R^4$, $R^5$, X and Y are well known in the art and/or can be derived from available chemicals according to known means. As used herein to describe an alkyl moiety, "lower" designates a a carbon content of from about one to about four carbon atoms. Chlorine and bromine are preferred halogen atoms.

A group of our novel compounds which are particularly valuable polyester dyes because of the cost:performance ratio of each member thereof corresponds to Formula (I) wherein
X is hydrogen, chlorine, bromine, cyano, lower alkylsulfonyl or nitro;
Y is hydrogen or cyano;
$R^1$ is lower alkyl or lower alkoxy;
$R^2$ is hydrogen;
$R^3$ is lower alkyl; and
$R^4$ is phenyl, lower alkylphenyl, lower alkoxyphenyl, chlorophenyl, bromophenyl, cyclohexyl, benzyl, 2-furyl or the group —$CH_2O$—Z in which Z is phenyl, lower alkylphenyl or lower alkoxyphenyl.

The novel compounds of our invention are prepared by diazotizing an amine having the formula $$D—NH_2 \qquad (II)$$

and coupling the resulting diazonium salt with a coupler having the formula (III) 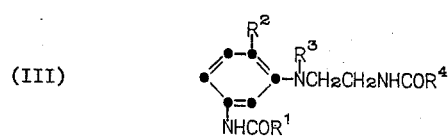

according to conventional procedures. Our azo compounds which contain a cyano-substituted phenyl diazo component also can be obtained by reacting the analogous halo-substituted azo compound with a cyanide salt in the presence of a copper catalyst.

The amines of Formula (II) are known compounds and/or can be obtained by known chemical techniques. The couplers of Formula (II) are prepared by cyanomethylating an m-acylamidoaniline compound, reducing the N-cyanomethyl-m-acylamidoaniline to the N-aminoethyl compound and then acylating the N-aminoethyl compound with a known acylating agent. The acylating step can be performed at elevated temperatures, e.g., 95°–100°C., in the presence of a solvent such as pyridine. The following couplers are prepared by treating N-(2-aminoethyl)-N-ethyl-m-acetamidoaniline with the acylating agents listed below:

| Acylating Agent | Coupler | Melting Point, °C. |
|---|---|---|
| Benzoyl chloride | N-(2-benzaimdoethyl)-N-ethyl-m-acetamidoaniline | 98–100 |
| 2-Furoyl chloride | N-(2-[2-furoyl]aminoethyl)-N-ethyl-m-acetamidoaniline | 149–150 |
| Cyclohexoyl chloride | N-(2-cyclohexoylaminoethyl)-N-ethyl-m-acetamidoaniline | 89–91 |

-continued

| Acylating Agent | Coupler | Melting Point, °C. |
|---|---|---|
| Phenylacetyl chloride | N-(2-phenylacetamidoethyl)-N-ethyl-m-acetamidoaniline | 153–155 |
| p-Methoxybenzoyl chloride | N-(2-p-methoxybenzamidoethyl)-N-ethyl-m-acetamidoaniline | 174–176 |
| Phenoxyacetyl chloride | N-(2-phenoxyacetamidoethyl)-N-ethyl-m-acetamidoaniline | 103–106 |
| Ethyl Chloroformate | N-(2-ethoxycarbonylaminoethyl)-N-ethyl-m-acetamidoaniline | 120–122 |

The preparation and use of our novel compounds is further illustrated by the following examples.

EXAMPLE 1 p-Nitroaniline (6.9 g.) is dissolved in 5.4 ml. of conc. $H_2SO_4$ and 12.6 ml. of water. This solution is poured onto 50 g. of crushed ice. To this is added a solution of 3.6 g. of $NaNO_2$ in 8 ml. of water. The diazotization reaction mixture is stirred for 15 minutes. An aliquot of this diazonium solution (0.005 mole) is added to 0.005 mole of the coupler m-acetamido-N-ethyl-N,2-(phenoxyacetamido)ethylaniline which is dissolved in 25 ml. of 1:5 acid (1 part propionic:5 parts acetic acid), with cooling to keep the temperature below 15°C. The coupling mixture is buffered by adding ammonium acetate and allowed to stand for one hour. The reaction mixture is drowned with water and the product is collected by filtration and dried in air. The product is slurried in hot methanol, cooled, collected by filtration and washed with methanol to yield 1.5 g. of the compound having the formula

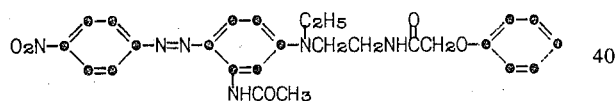

This compound has a visible absorption maximum at 506 nm. (acetone) and produces bright red shades on polyester fibers. The light-fastness, resistance to sublimation and build-up properties of this compound are excellent on polyester fibers.

EXAMPLE 2

2-Amino-5-nitrothiazole (1.45 g.) is dissolved in 25 g. of 50% $H_2SO_4$. The solution is cooled to −15°C. and a solution of 0.76 g. of $NaNO_2$ in 5 ml. of conc. $H_2SO_4$ is added below −10°C. The reaction mixture is stirred for 15 minutes at −15°C. and then added to a chilled solution of N-ethyl-N-[2-(4-methoxybenzamido)ethyl]-m-acetamidoaniline in 50 ml. of 50% $H_2SO_4$ plus 20 ml. of 1:5 acid. The coupling is allowed to stand for 15 minutes and is then drowned with water. The product is collected by filtration, washed with water and dried in air and then is purified by reslurrying in methanol. The visible absorption maximum of this compound is 585 nm. (acetone). This azo compound produces bright blue shades on polyester fibers, has good light-fastness, resistance to sublimation and build-up and has the structure

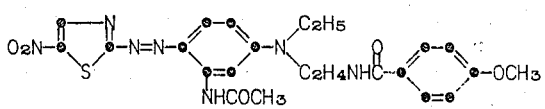

The azo compounds set forth in Table I are prepared by the procedures described in the preceding examples and conform to Formula (I). The color given for each compound designates the shade it produces on polyester fibers.

TABLE I

| Ex. No. | D | $R^1$ | $R^2$ | $R^3$ | $R^4$ | Color |
|---|---|---|---|---|---|---|
| 3 | 2-Br-6-CN-4-$NO_2$-phenyl | -$CH_3$ | H | -$C_2H_5$ | -$C_6H_5$ | Reddish-Blue |
| 4 | 2,6-di-CN-4-$NO_2$-phenyl | -$CH_3$ | H | -$C_2H_5$ | -$C_6H_5$ | Blue |
| 5 | 4-$NO_2$-phenyl | -$CH_3$ | H | -$C_2H_5$ | -$OC_2H_5$ | Red |
| 6 | 2-Cl-4-$NO_2$-phenyl | -$CH_3$ | H | -$C_2H_5$ | -$CH_2C_6H_5$ | Red |
| 7 | 2-Cl-4-$NO_2$-phenyl | -$C_2H_5$ | H | -$C_2H_5$ | -$C_6H_5$ | Red |
| 8 | 2-Cl-4-$NO_2$-phenyl | -$OC_2H_5$ | H | -$C_2H_5$ | -$C_6H_5$ | Red |
| 9 | 2-Cl-4-$NO_2$-phenyl | -$CH_2Cl$ | -$CH_3$ | H | -$C_6H_5$ | Red |
| 10 | 2-Cl-4-$NO_2$-phenyl | -$CH_2OCH_3$ | H | -$C_2H_5$ | -$C_6H_5$ | Red |
| 11 | 2-Br-4-$NO_2$-phenyl | -$CH_2OH$ | H | -$C_2H_5$ | -$C_6H_5$ | Red |
| 12 | 2-CN-4-$NO_2$-phenyl | -$CH_2OOCCH_3$ | H | -$C_2H_5$ | -$C_6H_5$ | Violet |
| 13 | 2-CN-4-$NO_2$-phenyl | -$C_6H_5$ | H | -$C_2H_5$ | -$C_6H_5$ | Violet |
| 14 | 2-CN-4-$NO_2$-phenyl | -$CH_2C_6H_5$ | H | -$C_2H_5$ | -$C_6H_5$ | Violet |
| 15 | 2-CN-4-$NO_2$-phenyl | -$CH_2OC_6H_5$ | H | -$C_2H_5$ | -$C_6H_5$ | Violet |
| 16 | 2-CN-4-$NO_2$-phenyl | -$CH_3$ | H | -$C_2H_5$ | -$C_6H_5$ | Violet |
| 17 | 2-Cl-6-CN-4-$NO_2$-phenyl | -$CH_3$ | H | -$C_2H_5$ | -$C_6H_5$ | Blue |
| 18 | 2-Br-6-CN-4-$NO_2$-phenyl | -$CH_3$ | H | -$CH_2CH_2CH_3$ | -$C_6H_5$ | Blue |
| 19 | 2-Br-6-CN-4-$NO_2$-phenyl | -$CH_3$ | H | -$CH_2CH(CH_3)_2$ | -$C_6H_5$ | Blue |
| 20 | 2-Br-6-CN-4-$NO_2$-phenyl | -$CH_3$ | H | -$CH(CH_3)C_2H_5$ | -$C_6H_5$ | Blue |
| 21 | 2-Br-6-CN-4-$NO_2$-phenyl | -$CH_3$ | H | -$C_2H_5$ | -$C_6H_{11}$ | Blue |
| 22 | 2-Br-6-CN-4-$NO_2$-phenyl | -$CH_3$ | H | -$C_2H_5$ | -$CH_2OC_6H_5$ | Blue |
| 23 | 2,6-di-CN-4-$NO_2$-phenyl | -$CH_3$ | H | -$C_2H_5$ | -$C_6H_5$ | Blue |
| 24 | 2,6-di-CN-4-$NO_2$-phenyl | -$CH_3$ | H | -$C_2H_5$ | -CH=CHCH=CHO | Blue |
| 25 | 2,6-di-CN-4-$NO_2$-phenyl | -$CH_3$ | H | -$C_2H_5$ | -$C_6H_4$-p-$OCH_3$ | Blue |

TABLE I-continued

| Ex. No. | D | R¹ | R² | R³ | R⁴ | Color |
|---|---|---|---|---|---|---|
| 26 | 2-CN-6-CH₃SO₂-4-NO₂-phenyl | -CH₃ | H | -C₂H₅ | -C₆H₅ | Blue |
| 27 | 2-CN-4,6-di-NO₂-phenyl | -CH₃ | H | -C₂H₅ | -C₆H₅ | Blue |
| 28 | 2-CN-4,6-di-NO₂-phenyl | -CH₃ | H | -C₂H₅ | -C₆H₄-p-OCH₃ | Blue |
| 29 | 2-CN-4,6-di-NO₂-phenyl | -CH₃ | H | -C₂H₅ | -C₆H₄-p-Cl | Blue |
| 30 | 2-CN-4,6-di-NO₂-phenyl | -CH₃ | -OCH₃ | -C₂H₅ | -OC₂H₅ | Blue |
| 31 | 2-CN-4-NO₂-6-CF₃-phenyl | -CH₃ | H | -C₂H₅ | -C₆H₅ | Blue |
| 32 | 2-CN-4-NO₂-6-(CH₃)₂NSO₂-phenyl | -CH₃ | H | -C₂H₅ | -C₆H₅ | Blue |
| 33 | 2-CN-4-NO₂-6-COCH₃-phenyl | -CH₃ | H | -C₂H₅ | -C₆H₅ | Blue |
| 34 | 2-CN-4-NO₂-6-COOC₂H₅-phenyl | -CH₃ | H | -C₂H₅ | -C₆H₅ | Blue |
| 35 | 2,6-di-Br-4-NO₂-phenyl | -CH₃ | H | -C₂H₅ | -C₆H₅ | Red |
| 36 | 2-Br-6-Cl-4-NO₂-phenyl | -CH₃ | H | -C₂H₅ | -C₆H₅ | Red |
| 37 | 2-CN-6-CH₂SO₂-4-NO₂-phenyl | -C₆H₁₁ | H | -C₂H₅ | -C₆H₅ | Violet |
| 38 | 5-NO₂-2-thiazolyl | -CH₃ | H | -C₂H₅ | -C₆H₅ | Blue |
| 39 | 5-NO₂-2-thiazolyl | -CH₃ | H | -C₂H₅ | -C₆H₁₁ | Blue |
| 40 | 5-NO₂-2-thiazolyl | -CH₃ | H | -C₂H₅ | -OC₂H₅ | Blue |
| 41 | 5-NO₂-2-thiazolyl | -CH₃ | H | -C₂H₅ | -CH₂C₆H₅ | Blue |
| 42 | 5-NO₂-2-thiazolyl | -CH₃ | H | -C₂H₅ | -C₆H₄-p-Cl | Blue |
| 43 | 5-NO₂-2-thiazolyl | -CH₃ | H | -C₂H₅ | -C₆H₄-p-CH₃ | Blue |
| 44 | 5-NO₂-2-thiazolyl | -CH₃ | H | -C₂H₅ | -C₆H₄-o-Cl | Blue |
| 45 | 5-NO₂-2-thiazolyl | -CH₃ | H | -C₂H₅ | -C₆H₄-p-C(CH₃)₃ | Blue |
| 46 | 5-NO₂-2-thiazolyl | -CH₃ | H | -C₂H₅ | -C=CHCH=CHO | Blue |
| 47 | 5-NO₂-2-thiazolyl | -C₂H₅ | H | -C₂H₅ | -C₆H₅ | Blue |
| 48 | 5-NO₂-2-thiazolyl | -C₂H₅ | H | -CH₂CH₂CH₃ | -C₆H₅ | Blue |
| 49 | 5-NO₂-2-thiazolyl | -C₂H₅ | H | -CH₂CH(CH₃)₂ | -C₆H₅ | Blue |
| 50 | 5-NO₂-2-thiazolyl | -C₂H₅ | -CH₃ | H | -C₆H₅ | Blue |
| 51 | 5-NO₂-2-thiazolyl | -OC₂H₅ | H | -(CH₂)₃CH₃ | -OC₂H₅ | Blue |
| 52 | 5-NO₂-2-thiazolyl | -C₆H₁₁ | H | -CH₂CH(C₂H₅)(CH₂)₃CH₃ | -CH₂OC₆H₅ | Blue |
| 53 | 5-NO₂-2-thiazolyl | -C₆H₅ | H | -C₂H₅ | -OC₂H₅ | Blue |
| 54 | 5-NO₂-2-thiazolyl | -CH₂C₆H₅ | H | -C₂H₅ | -OC₂H₅ | Blue |
| 55 | 5-NO₂-2-thiazolyl | -CH₂OC₆H₅ | H | -C₂H₅ | -OC₂H₅ | Blue |
| 56 | 5-NO₂-2-thiazolyl | -CH₂CH₂Cl | H | -C₂H₅ | -C₆H₅ | Blue |
| 57 | 5-NO₂-2-thiazolyl | -C₆H₄-p-OCH₃ | H | -C₂H₅ | -OC₂H₅ | Blue |
| 58 | 5-NO₂-2-thiazolyl | -C₆H₄-p-Cl | H | -C₂H₅ | -OC₂H₅ | Blue |

The preferred dyes have the formula

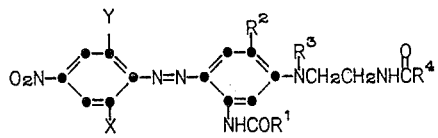

wherein
   X is hydrogen, chlorine, bromine, cyano, lower alkylsulfonyl, nitro;
   Y is hydrogen or cyano;
   R¹ is lower alkyl; lower alkyl substituted with halogen, hydroxy, lower alkoxy, lower alkanoyloxy, cyano or carbamoyl; or a group represented by R⁴;
   R² is hydrogen, lower alkyl or lower alkoxy;
   R³ is hydrogen or alkyl of up to about eight carbon atoms; and
   R⁴ is aryl, cyclohexyl, lower alkoxy, benzyl, 2-furyl or the group —R⁵—O—Z in which R⁵ is alkylene of up to about six carbon atoms and Z is aryl;
   in which
      each aryl group is phenyl or phenyl substituted with lower alkyl, lower alkoxy or halogen.

It is particularly noted that the monohalogen (chlorine or bromine) substituted diazo component gives markedly superior light fastness over the dihalogen substitution.

The polyester textile materials dyeable with our novel compounds and the techniques by which our compounds are applied thereto are well known in the art. For example, the compounds can be applied to polyester fibers according to the procedures described in French Pat. No. 2,008,404.

This invention has been described in detail with particular reference to certain preferred embodiments thereof, but it will be understood that variations and modifications can be effected within the spirit and scope of the invention.

We claim:
1. A compound having the formula

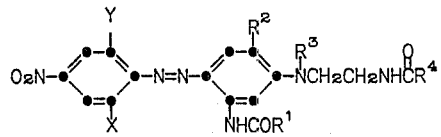

wherein
   X is hydrogen, chlorine, bromine, cyano, lower alkylsulfonyl, nitro;
   Y is hydrogen or cyano;
   R¹ is lower alkyl; lower alkyl substituted with chlorine, hydroxy, lower alkoxy, lower alkanoyloxy, cyano or carbamoyl; or a group represented by R⁴;
   R² is hydrogen, lower alkyl or lower alkoxy;
   R³ is hydrogen or alkyl of up to eight carbon atoms; and
   R⁴ is aryl, cyclohexyl, lower alkoxy, benzyl, or the group —R⁵—O—Z in which R⁵ is alkylene of up to six carbon atoms and Z is aryl;
   in which
      each aryl group is phenyl or phenyl substituted with lower alkyl, lower alkoxy, chlorine, or bromine.
2. A compound according to claim 1 having the formula

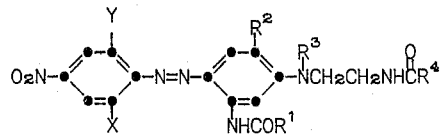

wherein
- X is hydrogen, chlorine, bromine, cyano, lower alkylsulfonyl or nitro;
- Y is hydrogen or cyano;
- $R^1$ is lower alkyl or lower alkoxy;
- $R^3$ is lower alkyl; and
- $R^4$ is phenyl, lower alkylphenyl, lower alkoxyphenyl, chlorophenyl, bromophenyl, cyclohexyl, benzyl, or the group —$CH_2O$—Z in which Z is phenyl, lower alkylphenyl or lower alkoxyphenyl.

3. A compound according to claim 1 having the formula

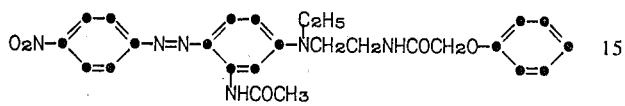

4. A compound according to claim 1 having the formula

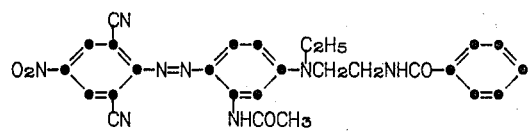

5. A compound according to claim 1 having the formula

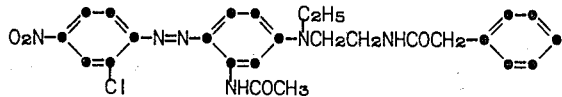

6. A compound according to claim 1 having the formula

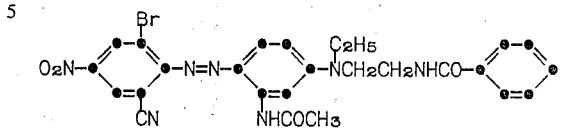

7. A compound according to claim 1 having the formula

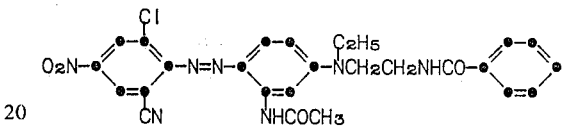

8. A compound according to claim 1 having the formula

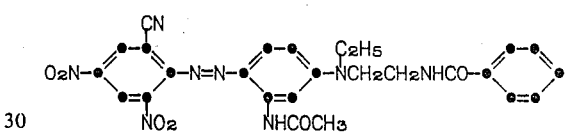

* * * * *